US012214405B2

(12) United States Patent
Woidasky

(10) Patent No.: US 12,214,405 B2
(45) Date of Patent: Feb. 4, 2025

(54) BENDING MACHINE, IN PARTICULAR A PRESS BRAKE, WITH A POSITION MEASURING SYSTEM

(71) Applicant: BYSTRONIC LASER AG, Niederönz (CH)

(72) Inventor: Lars Woidasky, Gotha (DE)

(73) Assignee: BYSTRONIC LASER AG, Niederönz (CH)

( * ) Notice: Subject to any disclaimer, the term of this patent is extended or adjusted under 35 U.S.C. 154(b) by 0 days.

(21) Appl. No.: 18/684,534

(22) PCT Filed: Aug. 18, 2022

(86) PCT No.: PCT/EP2022/073058
§ 371 (c)(1),
(2) Date: Feb. 16, 2024

(87) PCT Pub. No.: WO2023/025647
PCT Pub. Date: Mar. 2, 2023

(65) Prior Publication Data

US 2024/0261837 A1 Aug. 8, 2024

(30) Foreign Application Priority Data

Aug. 23, 2021 (EP) .................................... 21192576

(51) Int. Cl.
*B21D 5/02* (2006.01)
*B21C 51/00* (2006.01)
*B30B 15/18* (2006.01)

(52) U.S. Cl.
CPC ................ *B21D 5/02* (2013.01); *B21C 51/00* (2013.01); *B30B 15/18* (2013.01)

(58) Field of Classification Search
CPC ........ B21D 5/02; B21D 5/0272; B30B 15/04; B30B 15/041; B30B 15/044
(Continued)

(56) References Cited

U.S. PATENT DOCUMENTS 3,046,874 A * 7/1962 Dehn ....................... B30B 15/18 100/256
3,192,751 A * 7/1965 Baker ........................ B21J 9/12 72/19.9

(Continued)

FOREIGN PATENT DOCUMENTS

CN 109108158 A * 1/2019
EP 1011886 6/2000

(Continued)

OTHER PUBLICATIONS

International Search Report and Written Opinion, mailed Dec. 1, 2022, from PCT/EP2022/073058, 7 pages.

(Continued)

*Primary Examiner* — Jared O Brown
(74) *Attorney, Agent, or Firm* — Workman Nydegger

(57) ABSTRACT

A bending machine includes an upper beam that is movable in the direction of a primary axis (y) of the bending machine relative to a lower beam to form a workpiece which can be inserted between the upper beam and the lower beam via a front side. A position measuring system for measuring and monitoring a respective position of the upper beam with respect to a reference position is provided. The position measuring system is configured such that a linearly movable measuring unit follows a movement of the upper beam in the direction of the primary axis (y) and moves along a stationary linear element. The linearly movable measuring unit is held on the upper beam by a connecting element that is resistant to deformation in the direction of the primary axis (y), and configured to be elastic in the width direction (z) and/or a depth direction (x).

15 Claims, 6 Drawing Sheets

(58) Field of Classification Search
USPC .......................................................... 72/389.3
See application file for complete search history.

(56) References Cited

U.S. PATENT DOCUMENTS

| | | | | |
|---|---|---|---|---|
| 5,813,322 | A * | 9/1998 | Kuroda | B30B 15/0041 72/21.1 |
| 6,266,984 | B1 * | 7/2001 | Gasparini | B21D 5/02 72/702 |
| 2001/0009106 | A1 * | 7/2001 | Gerritsen | B21D 5/02 72/31.11 |
| 2008/0066520 | A1 * | 3/2008 | Sperrer | B21D 5/0272 72/389.5 |
| 2017/0066025 | A1 * | 3/2017 | Kurihara | B21D 5/0272 |

FOREIGN PATENT DOCUMENTS

| | | | | |
|---|---|---|---|---|
| EP | 1902792 | A2 * | 3/2008 | B21D 5/02 |
| JP | 2013202623 | A * | 10/2013 | |
| WO | WO-9843802 | A1 * | 10/1998 | B30B 15/14 |
| WO | 2003072278 | A1 | 9/2003 | |
| WO | WO-03072278 | A1 * | 9/2003 | B21D 5/02 |

OTHER PUBLICATIONS

International Preliminary Report on Patentability, mailed Nov. 27, 2023, from PCT/EP2022/073058, 12 pages.

* cited by examiner

BENDING MACHINE, IN PARTICULAR A PRESS BRAKE, WITH A POSITION MEASURING SYSTEM

The invention relates to a bending machine, in particular a press brake, with a position measuring system.

In bending machines, a deformation of a workpiece is achieved by a vertically movable upper beam that presses on the workpiece, which rests on a lower beam located below the upper beam. In order to control the adjustment path of the upper beam and to control a deformation process of the workpiece, it is known to provide a position measuring system in bending machines by which a position of the upper beam is determined with respect to a reference position during the deformation process.

For example, a bending machine is known from EP 1 902 792 A2, which comprises a position measuring device for determining an adjustment path of a press beam adjustable by means of a drive device between an upper and lower reversal position. By means of the position measuring device, a stroke position can be checked. The position measuring device is formed by optical-electronic measuring devices which are arranged at both opposite end regions of the press beam and determine the respective position via linear scales. EP 1 902 792 A1 does not provide any details on the design of the position measuring device.

Forces and deformations on the bending machine occurring during the deformation process of the workpiece change the absolute and relative position of the position measuring system, in particular in the direction of a primary axis of the bending machine along which the upper beam moves relative to the lower beam. Due to the forces and deformations, the achievable angular accuracy is adversely affected. In order to keep this impairment of the angular accuracy as low as possible, other known solutions use joints, spherical bearings and the like to decouple the position measuring system from undesired deformations of the bending machine and to transfer a position signal as precise as possible to a machine control.

However, a disadvantage of these solutions is that a required bearing or connection of the position measuring system cannot be designed to be completely free of play, since otherwise a relative movement would not be possible. Deformations resulting from thermal expansion and material fatigue can therefore not be fully compensated either. A measurement result falsified by this has a negative influence on the bending result, which is undesirable.

WO 03/072 278 A1 discloses a method for reducing bending angle errors when bending a metal sheet in a bending press, comprised of a stationary lower tool and a bending beam, which is driven by linear axles and provided with upper tools. The lower reversal point of the bending die is pre-calculated based on the pre-set specified value of the bending angle and on the force-path course measured during the bending process. The force-path course is measured by a position transducer and a force transducer and is processed inside the control unit.

EP 1 011 886 A1 discloses a press-bending machine for bending metal sheets having a measuring and control system operating on at least four points of the bending angle. The press-bending machine comprises an upper vertically reciprocal elongated bending punch, a lower static elongated bending matrix with at least a longitudinal bending groove, and a feeler means to measure the respective bending movement of the metal sheet in bending inside said bending groove, to control and command by data process logic unit the bending parameters of bending process in said bending machine. The feeler means operates with at least four bending detection points. All detecting points are conceived in such a way to be divided in two sets of bend detecting points, one to one side and one to the other side and in symmetrical way divided in number and position respective to the vertical plane passing along the respective sheet bending line corresponding with the bending corner of the resulting bent sheet.

It is therefore necessary to avoid external forces on the position measuring system in order to prevent plastic deformation and resulting damage to the position measuring system as well as measurement errors of the position measuring system.

It is the object of the invention to provide a position measuring system in a bending machine, which is functionally improved and has a high accuracy during a bending process. In particular, the position measuring system should be more robust against deformations of the bending machine.

This object is achieved by a bending machine according to the patent claims. Further developments of the invention are specified in the dependent claims.

The bending machine according to the invention includes an upper beam and a lower beam, wherein the upper beam is movable in the direction of a primary axis of the bending machine relative to the lower beam in order to form a workpiece, in particular a sheet which can be inserted or is inserted between the upper beam and the lower beam via a front side of the bending machine, by bending along a bending line, which extends in a width direction of the bending machine. The direction of the primary axis, which corresponds to a working direction of the bending machine, preferably extends in a vertical height direction of the bending machine.

Where in the following terms are used in connection with above or below or in relation to a working direction or (vertical) height direction, these terms always refer to the vertical top-bottom direction in the operating position of the bending machine, i.e. the position of its intended use.

Although the bending machine is particularly designed as a press brake, the bending machine can also be a bending press, a swivel bending machine and the like.

The bending machine includes at least one position measuring system for measuring and monitoring a respective position of the upper beam with respect to a reference position during a working process. The position measuring system is designed in such a way that a linearly movable measuring unit of the position measuring system follows the movement of the upper beam in the direction of the primary axis and in the process moves along a stationary linear element. Preferably, the stationary linear element is a measuring ruler along which the linearly movable measuring unit of the position measuring system moves.

According to the invention, the linearly movable measuring unit of the position measuring system is held on the upper beam by a connecting element which is resistant to deformation in the direction of the primary axis and which is designed to be elastic in the width direction of the bending machine and/or a depth direction of the bending machine.

The bending machine according to the invention provides the advantage that deformations of the bending machine which occur during a deformation process are almost completely decoupled from the position measuring system due to the elasticity of the connecting element in the width direction and/or the depth direction of the bending machine, and in the case of a deformation of the bending machine only the connecting element is deformed, in particular in a reversible manner. Undesired deformations of the bending machine thus do not have an influence on the measurement result. Instead, only the position of the upper beam in the direction of the primary axis is determined via the position measuring system.

In a preferred embodiment, the connecting element resistant to deformation is designed as a torsion element that is spring-elastic in the width direction of the bending machine and/or the depth direction of the bending machine. It is particularly preferred if the connecting element is designed as a torsion element which is elastic, in particular spring-elastic, both in the width direction of the bending machine and in the depth direction of the bending machine. This allows deformations in the width direction and the depth direction of the bending machine and decouples them from the position measuring system, in particular the components moving relative to one another. Due to the material and/or the shape of the torsion element, its elasticity in the width direction and in the depth direction of the bending machine can be selected and automatically adjusted, wherein it remains free of play even under changing conditions. For example, wear on machine guides can change the distances between moving and fixed machine elements. Here, the torsion element adapts to the conditions independently.

A further expedient embodiment provides that the connecting element has a lower rigidity in the width direction and/or in the depth direction of the bending machine than the stationary linear element and its receptacle held on the lower beam. Preferably, the connecting element has a lower rigidity in both the width direction and the depth direction of the bending machine than the stationary linear element and its receptacle held on the lower beam. This preferred design facilitates the decoupling of the position measuring system from any deformations that may occur on the bending machine.

In general, the connecting element can be geometrically designed with little material in the direction of the desired deformation, i.e. in the width direction and/or depth direction of the bending machine, in order to elastically deform as a result of the application of force due to a deformation of the bending machine. In the direction of the primary axis (i.e. in the working direction), the connecting element is then characterized by a comparatively large amount of material in order to achieve more resistance to deformation.

A preferred embodiment provides that the connecting element resistant to deformation in the direction of the primary axis is formed as a flat piece, which extends with its main sides in a plane perpendicular to the width direction, and wherein a long edge of the main side extends in the depth direction of the bending machine. The flat piece represents a torsion element which is elastic, in particular spring-elastic, in the width direction and/or depth direction of the bending machine and resistant to deformation in the direction of the primary axis. The flat piece allows for a partially elastic connection of the linearly movable measuring unit. In addition, it has a high fatigue strength to allow deformations in the undesired directions and to decouple them from the position measuring system, in particular the components that are movable relative to one another (namely the linearly movable measuring unit and the stationary linear element). Such a flat piece can be provided easily and at low cost. The elasticity can be selected based on the material and/or the shape of the flat piece.

According to a further preferred embodiment, the connecting element has a section with a material weakening. In a first variant, the material weakening is formed by a reduced material thickness in the width direction compared to the section or sections having no material weakening. Alternatively additionally, the material weakening is formed by one or more recesses. Further alternatively additionally, the connecting element is formed from two or more interconnected material layers using the sandwich technique, wherein a material interruption is provided in at least one of the material layers in the section with the material weakening. By selecting or combining the above possibilities for material weakening, the elasticity of the connecting element resistant to deformation can be adjusted. In this regard, an adaptation to the type and/or size and/or design of the bending machine is possible.

According to a further preferred embodiment, the section with the material weakening in the connecting element is formed closer to the upper beam in the depth direction than to the linearly movable measuring unit. This facilitates the elasticity in the width direction and/or depth direction of the bending machine with simultaneous resistance to deformation in the direction of the primary axis.

According to a further expedient embodiment, the connecting element resistant to deformation has spring steel or is formed of spring steel. The connecting element can also be made of or formed of a material with similar properties with high elasticity.

According to a further preferred embodiment, the connecting element is held on an underside of the upper beam and a section of the upper beam lying on the outside in the width direction. The mounting of the connecting element and thus the position measuring system at a position with low deformation influence on the machine frame of the bending machine favours the desired characteristics of the lowest possible influence of the position measuring system by possible deformations of the machine frame.

This approach is based on the consideration that the position with the least deformation influence is located at the outer ends of the upper and lower beams. A relative movement and/or elongation, for example due to thermal expansion, can be positive for the result to be achieved in bending a workpiece if the distance of the points to be measured between the upper beam and the lower beam changes to the same extent. However, the undesirable torsion or bending of the stationary linear element can be equally avoided.

A further preferred embodiment provides that the connecting element is held directly on the upper beam or via a receptacle. This preferably has a high rigidity.

In a further preferred embodiment, the connecting element is held on a slider of the linearly movable measuring unit, wherein a sensing element of the linearly movable measuring unit is fastened to the slider.

According to a further preferred embodiment, the connecting element is detachably arranged on the upper beam and the linearly movable measuring unit via a respective fastening means, such as a screw. This allows the connecting element to be replaced quickly, e.g. if operating conditions change. As a result, a modular bending machine can be provided. For example, connecting elements resistant to deformation with different material properties can be used in the direction of the primary axis if particularly high deformations are expected during a working process or the geometric conditions change. This is the case, among other situations, with large changes in bending lengths or forces. Also in the event of damage, i. e. damage to the connecting element, it can be replaced quickly, which reduces machine downtime.

According to a further preferred embodiment, the connecting element as well as its mounting on the linearly movable measuring unit and the upper beam are thermally conductive. This allows a parallel expansion of the position measuring system and the machine frame of the bending machine, which favours the desired deformation characteristics and accuracy requirements.

In the following, an exemplary embodiment of the invention is described in detail with reference to the accompanying figures.

Figure 1:
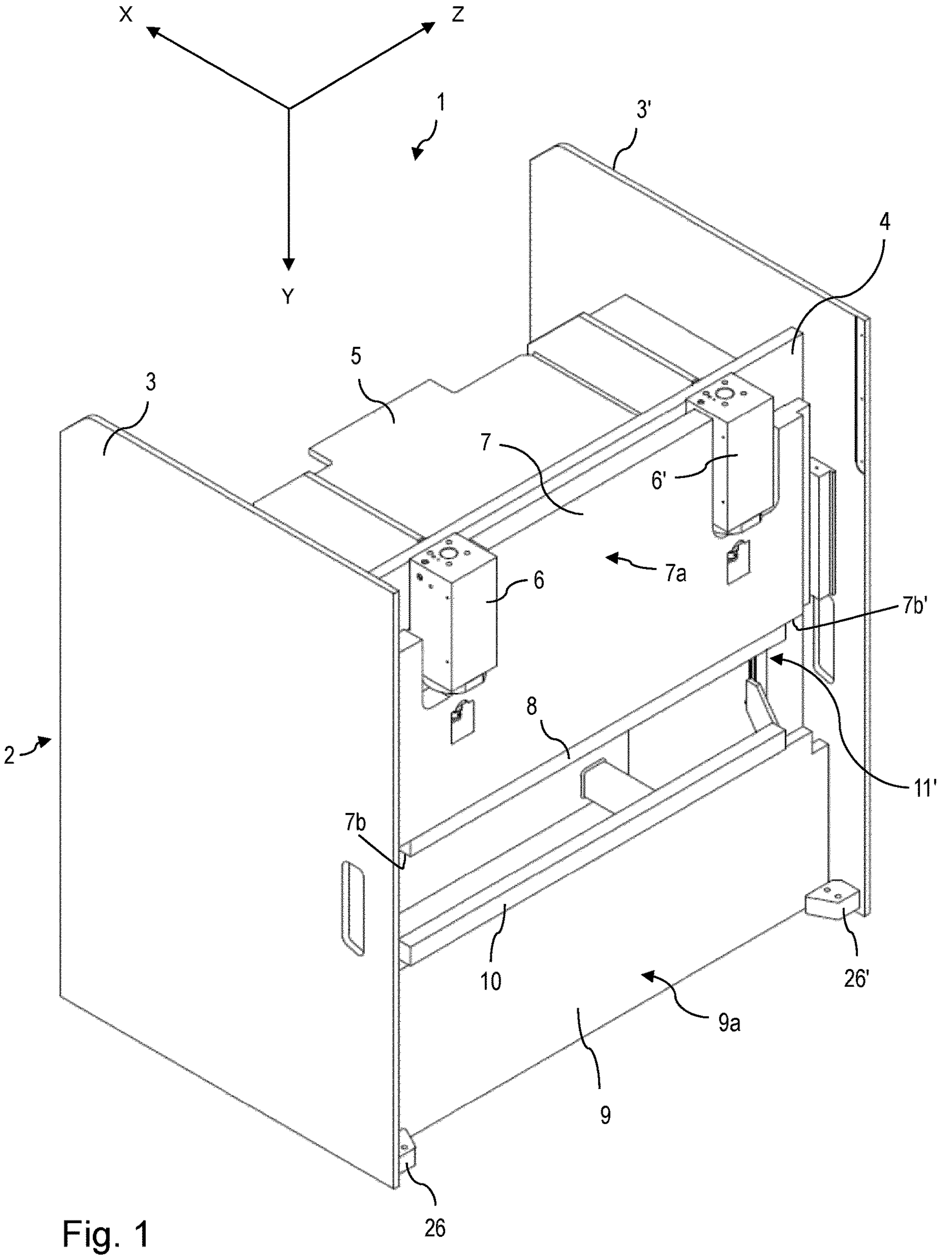
FIG. 1 shows a perspective view of an embodiment of a bending machine according to the invention in the form of a press brake, viewed from the front at an angle.

In the following, an embodiment of the invention is described based on a bending machine in the form of a press brake. A perspective view of the press brake is shown in FIG. 1, where it is designated with reference sign 1. In FIG. 1 and also in the other FIGS. 2 to 6, a spatial coordinate system is shown to describe the directions of the bending machine 1. The x-direction corresponds to a depth direction of the bending machine 1 and a workpiece to be bent is inserted in the direction of the x-direction into the bending machine 1 via its front side. In contrast, the y-direction is a width direction of the bending machine 1. The depth direction x and the width direction z lie in one horizontal plane. The y-direction is the vertical direction and corresponds to a height direction y of the bending machine 1. A primary axis of the bending machine 1 extends in the y-direction of the coordinate system, which is also referred to below as the working direction.

The bending machine 1 comprises a frame 2 including, among other things, two side stands 3, 3' and a frame plate 4. An upper beam 7 and a lower beam 9 are provided at the front side of the bending machine 1. The front side of the upper beam 7 is designated with reference sign **7*a* and the front side of the lower beam 9 is designated with reference sign 9*a*. On the upper edge of the lower beam 9 there is a tool table 10, on which lower tools are fastened during operation of the bending machine 1. In contrast, the upper beam 7 has a tool receptacle 8 for fastening corresponding upper tools. During operation of the bending machine 1, a sheet (not shown) is inserted into the space between the upper beam 7 and the lower beam 9, and the upper beam 7 is then moved downwards in its working direction so that the upper tools press into the lower tools, thereby deforming the sheet. To ensure a stable stand of the bending machine during a bending process, it is anchored to the floor in its corners using corresponding anchoring means 26, 26'**.

A hydraulic actuator is used to move the upper beam 7 in the working direction, which is mostly located on the top of a reinforcement plate 5 and that extends between the side stands 3 and 3'. In the illustration of FIG. 1, only two hydraulic cylinders 6 and 6' of the actuator are visible, which are attached to the frame plate 4 and positioned in recesses of the upper beam 7. Corresponding cylinder rods are connected to the upper beam 7 in this region and can cause the upper beam 7 to move in the direction of the primary axis, i.e. the working direction or vertical height direction y.

For measuring and monitoring a respective position of the upper beam 7 with respect to a reference position during a working process in which the upper beam 7 is moved in the direction of the primary axis (i.e. in the vertical height direction y) of the bending machine 1 relative to the lower beam 9, two position measuring systems 11, 11' are provided on the bending machine 1. Although in the exemplary embodiments the bending machine 1 is shown with two separate position measuring systems 11, 11', it is to be noted that to realize the measurement and monitoring of the position of the upper beam 7 it is sufficient to provide only a single position measuring system 11 or 11' on the bending machine.

Figure 2:
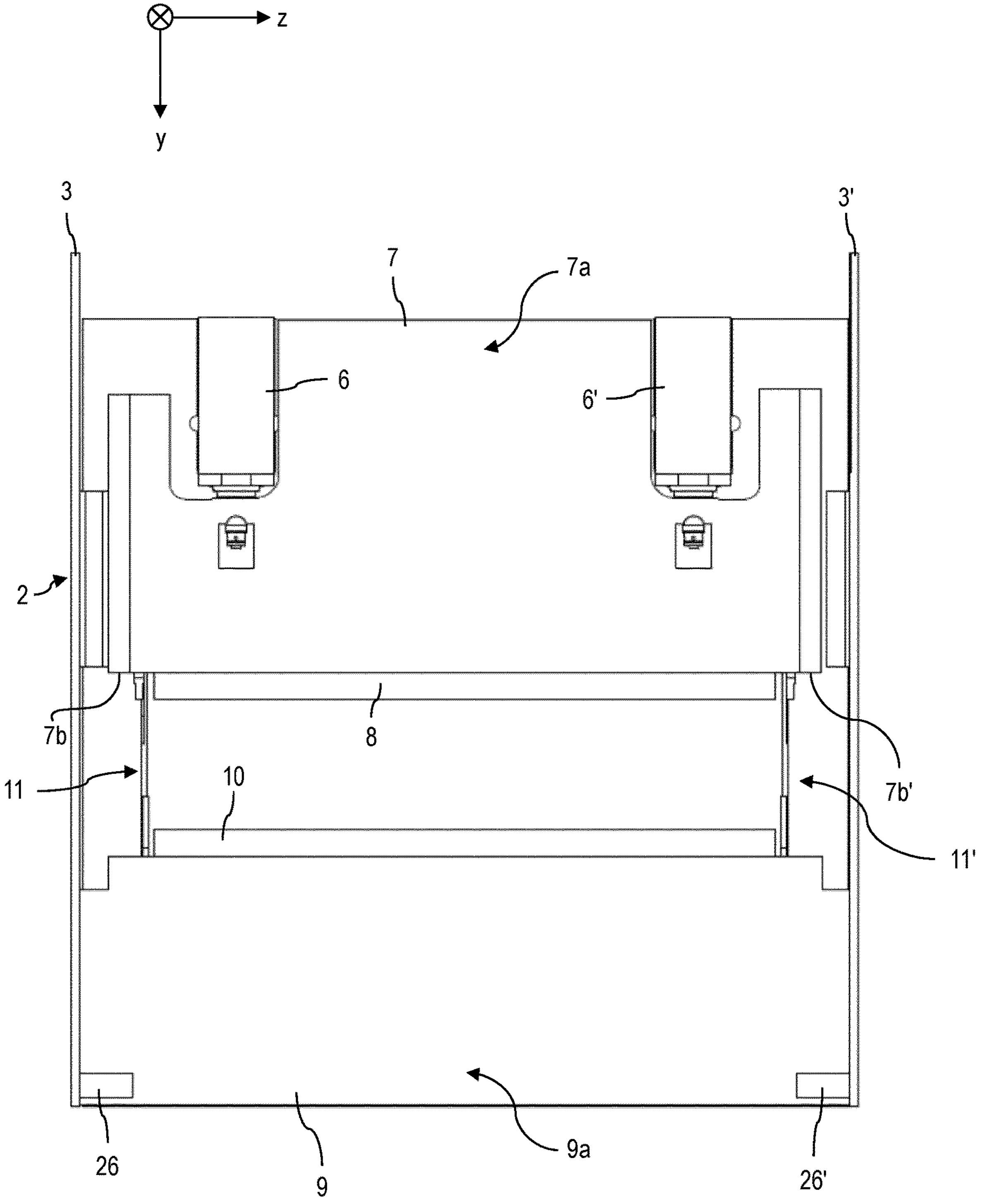
FIG. 2 shows a front view of the bending machine of FIG. 1.
Figure 3:
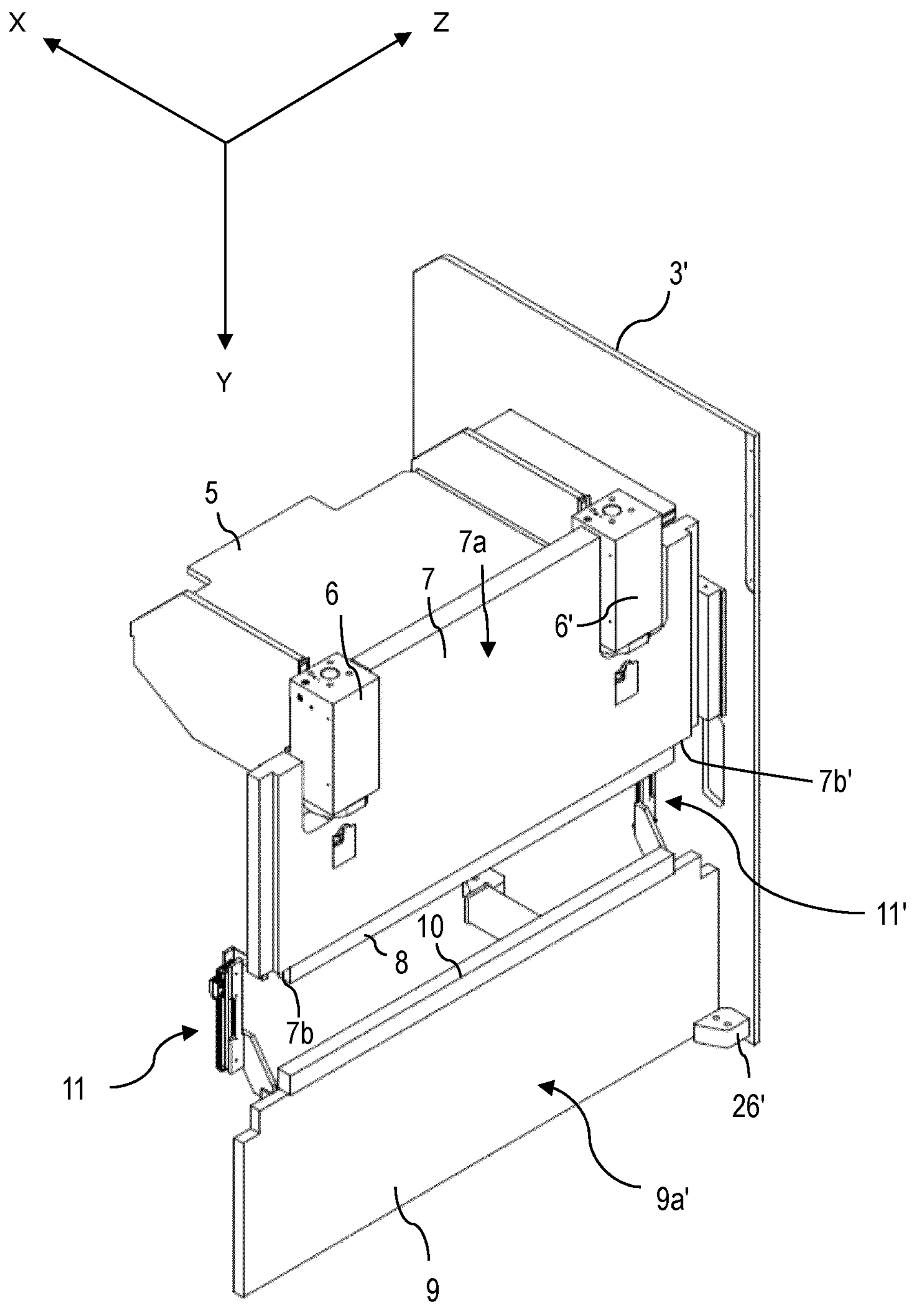
FIG. 3 shows a detailed perspective view of the bending machine of FIG. 1 while omitting a left side part.
Figure 4:
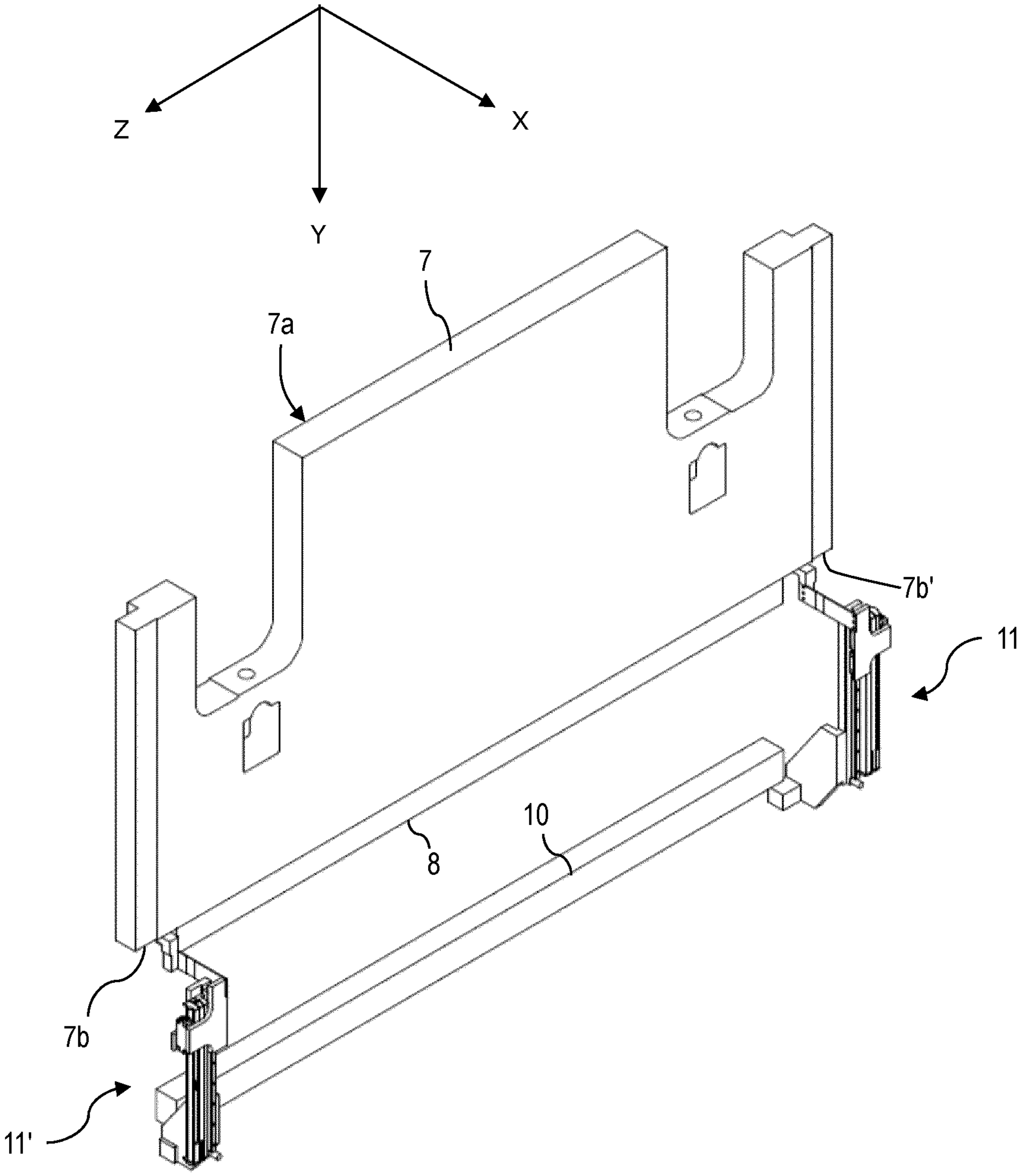
FIG. 4 shows a detailed perspective view from behind of the upper beam of the bending machine with an installed position measuring system.

As can be seen more clearly from FIGS. 2 to 4, the position measuring systems 11, 11' are arranged and held at the opposite outer ends of the upper beam 7 and the lower beam 9, wherein the position measuring systems 11, 11' extend into the interior of the machine body formed by the side stands 3, 3', the frame plate 4 and the reinforcement plate 5. This can best be seen, for example, in the detailed perspective view of FIG. 3.

The position measuring system is explained in detail below with reference to the position measuring system 11 shown in FIGS. 5 and 6 in a detailed perspective view and a top view from the rear. The design of the position measuring system 11' shown in FIGS. 2 to 4 is structurally identical and is merely mirror-inverted with respect to the vertical x-y plane as an example.

The position measuring system 11 has a linearly movable measuring unit 12 and a stationary linear element 13. The linearly movable measuring unit 12 has a slider 21 and a sensing element 22 fastened to the slider 21. The linearly movable measuring unit 12 of the position measuring system 11 is held on the upper beam 7 by a connecting element 14, which is resistant to deformation in the direction of the primary axis, i.e. the vertical height direction y.

Figure 5:
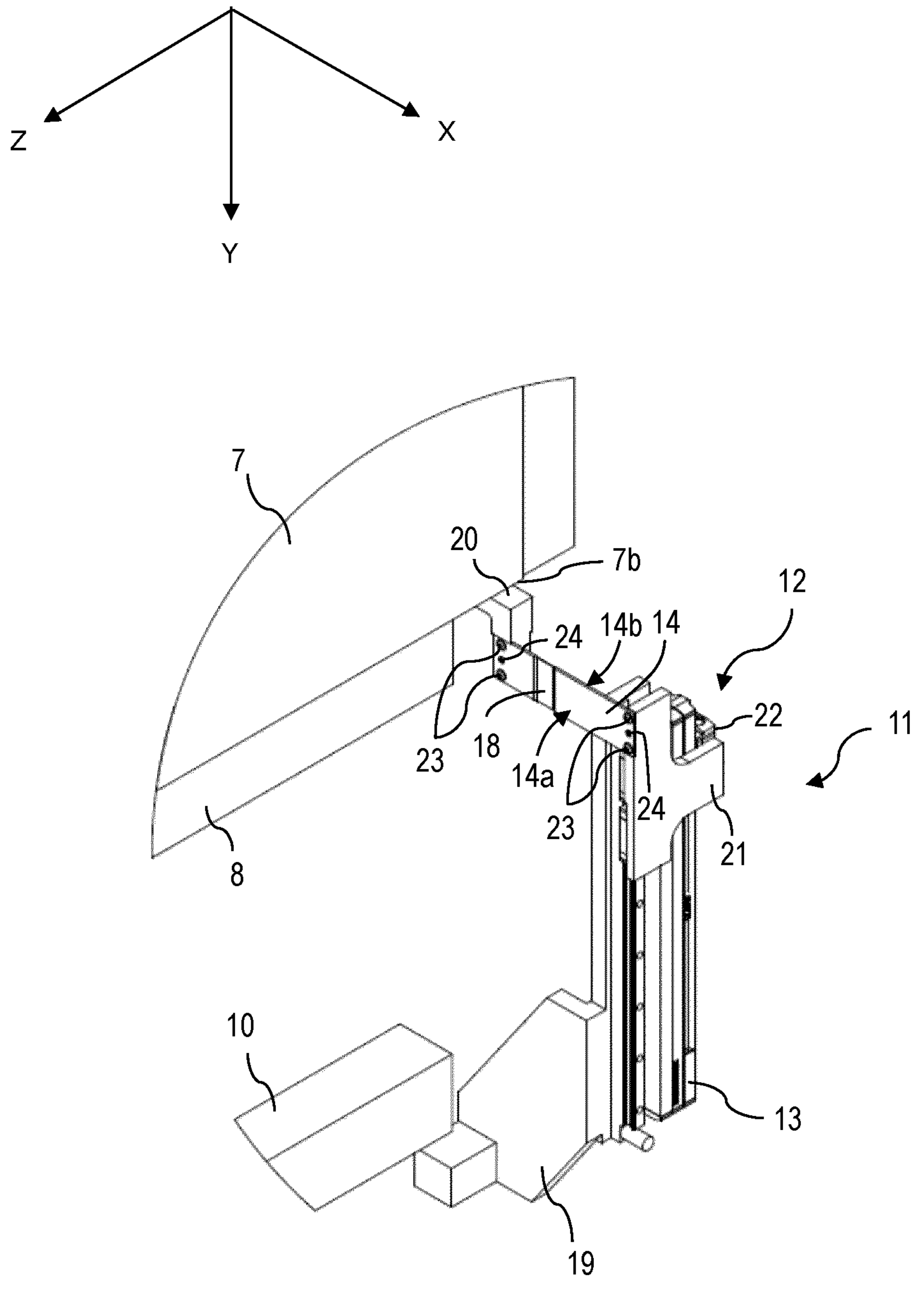
FIG. 5 shows a detail view showing the position measuring system of FIG. 4 in detail.

The stationary linear element 13, which is designed, for example, as a measuring ruler, is fastened to the lower beam, not shown in FIG. 5, by means of a receptacle 19 resistant to deformation, so that it comes to rest next to the tool holder 10 in the width direction z. The stationary linear element 13 is mounted fixed to the lower beam 9 and thus to the bending machine 1 via the receptacle 19.

When the upper beam 7 moves in the working direction, i.e. in the direction of the primary axis or in the height direction y, the linearly movable measuring unit 12 of the position measuring system 11 follows the movement of the upper beam 7 and in the process moves along the stationary linear element 13. For this purpose, the slider 21 of the linearly movable measuring unit 12 is moved along the stationary linear element 13 via a guide 25 (see FIG. 6). As the linearly movable measuring unit 12 moves relatively along the stationary linear element 13, its sensing element 22 moves along the stationary linear element 13 and enables a position of the upper beam 7 with respect to a predefined reference position to be determined during a working process.

Figure 6:
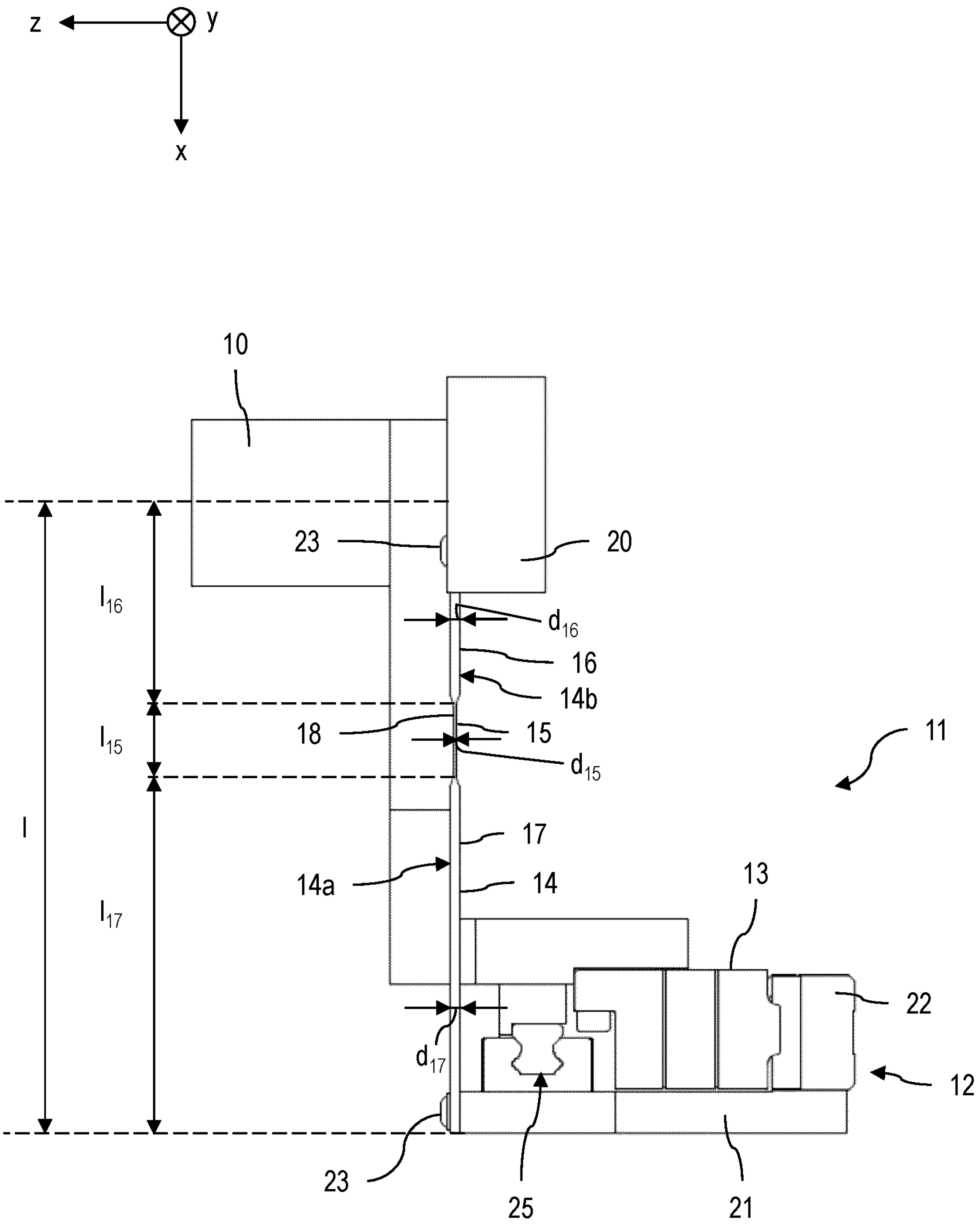
FIG. 6 shows a top view of the position measuring system of FIG. 4.

The structural design of the guide 25 shown in FIG. 6, in which an element of the slider 21 engages around a corresponding element of the stationary linear element, is merely exemplary in nature. Generally speaking, an internal or external guide of the slider 21 along the stationary linear element 13, which are known in principle, would also be conceivable as an alternative.

A receptacle 20 is provided on the underside **7*b* of the upper beam 7 to connect the connecting element 14, which is resistant to deformation, to the upper beam 7. The receptacle 20 of the upper beam 7 is formed in an exemplary manner in the shape of an "L". One of the two legs of the receptacle 20 is detachably or non-detachably fastened to the underside 7***b* of the upper beam 7. The other of the two legs, which extends in the direction of the primary axis, i.e. in the height direction y, is used to fasten a machine side end of the connecting element 14. The other, measuring system side end of the connecting element 14 is fastened to the slider 21 of the linearly movable measuring unit 12.

The connecting element 14 is preferably fastened to the upper beam 7 via the receptacle 20, as shown in FIGS. 1 to 5, on a section of the upper beam 7 lying on the outside in the width direction z, since the section lying on the outside is subject to less deformation in comparison with other sections of the upper beam 7 during a bending process of the sheet metal. This, among other aspects described below, favours the accuracy of the position measuring system during a bending process.

The connecting element 14 is fastened to the receptacle 20 of the upper beam 7 and to the slider 21 by means of one or more fastening means 23, e.g. screws, in each case to allow the connecting element 14 and the receptacle 20 of the upper beam 7 and the linearly movable measuring unit 12 to be detachable. This allows easy replacement of the connecting element 14, depending on the existing operating conditions.

In the exemplary embodiment shown here, two fastening means 23 each are provided for fastening the connecting element 14 to the receptacle 20 and to the slider 21. Between the respective pair of fastening means 23, the connecting element has, here by way of example, a respective adjustment element 24, for example in the form of a bore, to facilitate fastening and correct alignment relative to the receptacle 20 and the slider 21. For this purpose, the receptacle 20 and the slider 21 can have projections corresponding to the adjustment elements 24, which engage in the associated adjustment elements 24.

The connection of the slider 21, which follows the stroke of the upper beam 7, to the upper beam 7 is made exclusively via the deformation element 14, which is thus the only connecting element with an influence on detrimental deformations of the machine body. These deformations are undesirable in the width direction z and depth direction x. Measurement data of the upper beam 7 are only desired and relevant in the height direction y, i.e. in the direction of the primary axis.

Deformations of the machine body that have a negative effect on position measurement can occur, for example, if the upper beam 7 does not move in parallel to the lower beam 9 in the direction of the primary axis (height axis y), resulting in an inclined position of the upper beam 7. When using two position measuring systems 11, 11' per upper beam 7, as shown in FIGS. 1 to 4, this leads to an undesired simultaneous movement in the width direction z. A tolerance of this deformation leads to a negative bending result and damage to the position measuring systems 11, 11'. Similarly, such negative influences occur in the depth direction x when the machine body expands as a result of the force applied during bending and the upper beam 7 moves relative to the machine body.

These adverse effects are eliminated or at least largely reduced by the deformation element 14. The term "deformation resistance" of the connecting element 14 refers to a deformation resistance in the direction of the primary axis, i.e. in the height direction y. The connecting element 14 is designed, for example, as a torsion element which, in contrast, is designed to be elastic, in particular spring-elastic, in the width direction z of the bending machine 1 and/or the depth direction x of the bending machine 1. Preferably, elasticity is provided in both the width direction z and the depth direction x of the bending machine 1.

Unwanted torsion or bending due to forces and deformations occurring during the bending process on the machine body and/or machine axes of the bending machine 1 is thus not transmitted to the stationary linear element 13. The connecting element 14, which is elastic in the width direction z and/or in the depth direction x of the bending machine 1, decouples deformations of the machine body almost completely from the position measuring system 11. Instead, only the connecting element 14 is deformed, in particular deformed in a reversible manner. The deformation is reversible as the connecting element returns to its original shape at the end of a working or bending process when the machine body is unloaded. This has the advantage that unwanted deformations of the machine body of the bending machine 1 do not influence the measurement result, but only the position of the upper beam 7 in the direction of the primary axis, i.e. in the height direction y, is determined via the slider 21 and the sensing element 22 fastened to it.

By design, the connecting element 14 has at least one partially elastic material with high fatigue strength to allow deformations in the undesired directions, namely the width direction z and/or the depth direction x, and thereby decouple them from the position measuring system 11, in particular the slider 21.

While the connecting element 14 is designed as an elastic element in the preferred directions mentioned, the receptacle 19 of the lower beam 9 and the receptacle 20 of the upper beam 7 are designed more rigidly in comparison. This arrangement almost completely decouples deformations of the machine body from the position measuring system 11 by deforming the connecting element 14 when necessary.

The connecting element 14 resistant to deformation is generally designed with little material in the direction of the desired elasticity, i.e. in the width direction z and/or depth direction x, in order to be able to deform elastically as a result of the application of a force. In the direction of the primary axis (height direction y), the connecting element 14 is characterized by a comparatively large amount of material to achieve more resistance to deformation.

In the exemplary embodiment shown in the figures, the connecting element 14 is designed as a flat piece that meets these requirements. Two opposite main sides 14*a*, 14*b* extend in the vertical x-y plane perpendicular to the width direction z. The connecting element 14, which is designed as a flat piece, has a long edge extending in the depth direction x of the bending machine 1. The long edge is the longest edge of the flat piece and much longer than the other two edges in the height direction y and width direction z. This can best be seen, for example, in FIG. 5.

To achieve the desired elastic properties, the connecting element 14 has a section 15 with a material weakening 18 (FIG. 6). The section 15 with the material weakening 18 has a length $l_{15}$ and a thickness dis. The section 15 with material weakening lies between two sections 16, 17 without material weakening, which have a length $l_{16}$ and $l_{17}$, respectively, and a thickness $d_{16}$ and $d_{17}$. The total length l of the connecting element 14 is the sum of the lengths $l_{15}$, $l_{16}$, $l_{17}$ of the sections 15, 16, 17, i.e. $l=l_{15}+l_{16}+l_{17}$. The thicknesses $d_{16}$ and $d_{17}$ of the sections 16, 17 without material weakening are the same in the present exemplary embodiment, i.e. $d_{16}=d_{17}$. At the same time, the thicknesses $d_{16}$ and $d_{17}$ of the sections 16, 17 without material weakening in the present exemplary embodiment are greater than the thickness dis of the section 15 with material weakening, i.e. $d_{15}<d_{16}$ and $d_{15}<d_{17}$.

The lengths $l_{15}$, $l_{16}$, $l_{17}$ of the sections 15 with material weakening and 16, 17 without material weakening as well as the thicknesses $d_{15}$, $d_{16}$, $d_{17}$ are generally chosen depending on the bending machine 1, its geometrical conditions and/or the forces occurring during the bending process. Preferably, the length $l_{16}$ of the section 16 without material weakening fastened to the receptacle 20 of the upper beam 7 is smaller than the length $l_{17}$ of the section 17 without material weakening fastened to the slider 21, i.e. $l_{16}<l_{17}$.

The section 15 with the material weakening 18 can be formed with the reduced material thickness in the width direction z compared to the sections 16, 17 having no material weakening, as is shown in FIGS. 5 and 6. Alternatively additionally, the material weakening 18 can also be formed by one or more recesses (not shown in the figurative representations). In this case, the thicknesses $d_{16}$ and $d_{17}$ of the sections 16, 17 without material weakening can correspond to the thickness dis of section 15 with material weakening, i.e. $d_{15}=d_{16}=d_{17}$. The thicknesses $d_{16}$ and $d_{17}$ of the sections 16, 17 without material weakening can alternatively be greater than the thickness $d_{15}$ of the section 15 with material weakening, i.e. $d_{15}<d_{16}$ and $d_{15}<d_{17}$.

In a further alternative, the connecting element resistant to deformation can also be formed from two or more interconnected material layers using the sandwich technique. In this regard, in the section 15 with the material weakening 18, a material interruption is provided in at least one of the other material layers (not shown in the figures). In the section 15 with the material weakening 18, one or more recesses could also be provided.

The connecting element 14 can be made of spring steel or have spring steel. Alternatively or additionally, similar material with high elasticity can be used.

It is expedient that the material of the connecting element resistant to deformation and its receptacles 19, 20 on the upper beam 7 and the lower beam 7 have thermal conductivity. This allows a parallel expansion of the position measuring system 11 and the machine body.

The embodiment of the invention described in the foregoing provides a number of advantages.

The fastening means 23 used to hold the connecting element 14 resistant to deformation to the upper beam 7 and the linearly movable measuring unit 12 make it possible to have a modular system in which the connecting element 14 can be quickly replaced in a simple manner when operating conditions change. For example, connecting elements resistant to deformation made of different materials with different material properties can be used if particularly high deformations of the machine body are expected or if the geometrical conditions change, e.g. in the case of greater bending lengths or forces. In addition, the connecting element 14 can be quickly replaced in the event of damage. This can reduce machine downtime.

The use of the connecting element 14 resistant to deformation does not require any lubrication or special maintenance measures, thus providing a reliable position measuring system by simple and inexpensive means.

The connection of the connecting element on the upper beam 7 and the linearly movable measuring unit 12 ensures freedom from play between the stationary linear element 13 and the linearly movable measuring unit 12, which moves relative to it, allowing for an optimum position control in the direction of the primary axis. Oscillation as a result of changing control parameters cannot occur with a connection that is free from play. This increases the measurement accuracy.

LIST OF REFERENCE SIGNS

1 Bending machine
2 Frame
3, 3' Side stand
4 Frame plate
5 Reinforcement plate
6, 6' Hydraulic cylinder
7 Upper beam
7*a* Front side of the upper beam
7*b*, 7*b'* Underside of upper beam
8 Tool receptacle
9 Lower beam
9*a* Front side of the lower beam
10 Tool holder
11, 11' Position measuring system
12 Linearly movable measuring unit
13 Stationary linear element
14 Connecting element
14*a* Main side of the connecting element
14*b* Main side of the connecting element
15 Section with material weakening
16 Section without material weakening
17 Section without material weakening
18 Material weakening
19 Receptacle of the lower beam 9
20 Receptacle of the upper beam 7
21 Slider
22 Sensing element
23 Fastening means (e.g. screw)
24 Adjustment element (e.g. bore)
25 Guide
26, 26' Anchoring means
l Length of connecting element 14
$l_{15}$ Length of section 15
$l_{16}$ Length of section 16
$l_{17}$ Length of section 17
$d_{15}$ Thickness of section 15
$d_{16}$ Thickness of section 16
$d_{17}$ Thickness of section 17

The invention claimed is:

1. A bending machine comprising:

an upper beam and a lower beam, wherein the upper beam is movable in a direction of a primary axis (y) of the bending machine relative to the lower beam in order to form a workpiece which can be inserted between the upper beam and the lower beam via a front side of the bending machine by bending along a bending line, wherein the bending line extends in a width direction (z) of the bending machine, wherein the bending machine includes at least one position measuring system for measuring and monitoring a respective position of the upper beam with respect to a reference position during a working process, wherein the at least one position measuring system is configured in such a way that a linearly movable measuring unit of the at least one position measuring system follows a movement of the upper beam in the direction of the primary axis (y) and in the working process moves along a stationary linear element, wherein the linearly movable measuring unit of the at least one position measuring system is held on the upper beam by a connecting element, wherein the connecting element is resistant to deformation in the direction of the primary axis (y), configured to be spring-elastic in the width direction (z) of the bending machine and/or a depth direction (x).

2. The bending machine according to claim 1, wherein the connecting element is configured as a torsion element, which is designed to be spring-elastic in the width direction (z) of the bending machine and/or the depth direction (x).

3. The bending machine according to claim 1, wherein the connecting element has a lower rigidity in the width direction (z) and/or in the depth direction (x) of the bending machine than the stationary linear element.

4. The bending machine according to claim 1, wherein the connecting element resistant to deformation in the direction of the primary axis is formed as a flat piece, which extends in a plane perpendicular to the width direction (z), and wherein an edge of each of two sides of the connecting element extends in the depth direction (x) of the bending machine.

5. The bending machine according to claim 4, wherein the connecting element has a section with a material weakening.

6. The bending machine according to claim 5, wherein the material weakening is formed by a reduced material thickness in the width direction (z) compared to a section or sections having no material weakening.

7. The bending machine according to claim 5, wherein the material weakening is formed by one or more recesses.

8. The bending machine according to claim 5, wherein the connecting element is formed from two or more interconnected material layers using a sandwich technique, wherein a material interruption is provided in at least one of the material layers in the section with the material weakening.

9. The bending machine according to claim 5, wherein the section with the material weakening in the connecting element is formed closer to the upper beam in the depth direction (x) than to the linearly movable measuring unit.

10. The bending machine according to claim 1, wherein the connecting element has spring steel or is formed of spring steel.

11. The bending machine according to claim 1, wherein the connecting element is held on an underside of the upper beam and a section of the upper beam lying on an outside in the width direction (z).

12. The bending machine according to claim 1, wherein the connecting element is held directly on the upper beam or via a receptacle.

13. The bending machine according to claim 1, wherein the connecting element is held on a slider of the linearly movable measuring unit, wherein a sensing element of the linearly movable measuring unit is fastened to the slider.

14. The bending machine according to claim 1, wherein the connecting element is detachably arranged on the upper beam and the linearly movable measuring unit via a respective fastening means.

15. The bending machine according to claim 1, wherein the connecting element, a mounting of the connecting element, and the upper beam are thermally conductive.

* * * * *